United States Patent
MacLean, III et al.

(10) Patent No.: US 8,237,575 B2
(45) Date of Patent: Aug. 7, 2012

(54) METHOD, APPARATUS, AND SYSTEMS FOR REMOTELY MONITORING THE LOCATION AND USAGE HISTORY OF RADIOACTIVE MATERIALS STORED WITH A SHIELDED CONTAINER OR OVERPACK

(75) Inventors: James S. MacLean, III, Coppell, TX (US); Brandon C. Taylor, Lewisville, TX (US)

(73) Assignee: Geoforce, Inc., Irving, TX (US)

( * ) Notice: Subject to any disclaimer, the term of this patent is extended or adjusted under 35 U.S.C. 154(b) by 222 days.

(21) Appl. No.: 12/288,909

(22) Filed: Oct. 24, 2008

(65) Prior Publication Data

US 2009/0109040 A1    Apr. 30, 2009

Related U.S. Application Data

(60) Provisional application No. 61/000,403, filed on Oct. 25, 2007.

(51) Int. Cl.
  *G08B 17/02*  (2006.01)
  *G08B 1/08*   (2006.01)
  *G08B 17/10*  (2006.01)

(52) U.S. Cl. ............... 340/600; 340/539.1; 340/539.13; 340/572.1; 340/632

(58) Field of Classification Search .................. None
    See application file for complete search history.

(56) References Cited

U.S. PATENT DOCUMENTS

| | | | |
|---|---|---|---|
| 6,216,087 B1* | 4/2001 | Want et al. | 701/207 |
| 6,965,314 B2* | 11/2005 | Bohinc, Jr. | 340/539.26 |
| 7,190,265 B1* | 3/2007 | Bohinc, Jr. | 340/539.26 |
| 2004/0212499 A1* | 10/2004 | Bohinc, Jr. | 340/539.29 |
| 2005/0113107 A1* | 5/2005 | Meunier | 455/456.1 |
| 2010/0016022 A1* | 1/2010 | Liu et al. | 455/561 |
| 2010/0171611 A1* | 7/2010 | Gao et al. | 340/539.12 |

* cited by examiner

*Primary Examiner* — Julie Lieu

(57) ABSTRACT

A radioactive source information tracking and reporting system and method is disclosed. The system and method include a device operable to detect a presence of a radioactive source contained within a shielded container. The device is further operable to detect a location of the shielded container. A message is generated and transmitted to a central facility. The message includes a shielded container identifier, a location of the shielded container, and an indication of the presence of the radioactive source.

23 Claims, 6 Drawing Sheets

METHOD, APPARATUS, AND SYSTEMS FOR REMOTELY MONITORING THE LOCATION AND USAGE HISTORY OF RADIOACTIVE MATERIALS STORED WITH A SHIELDED CONTAINER OR OVERPACK

CROSS-REFERENCE TO RELATED APPLICATION(S) AND CLAIM OF PRIORITY

The present application is related to U.S. Provisional Patent No. 61/000,403, filed Oct. 25, 2007, entitled "METHOD, APPARATUS AND SYSTEMS FOR REMOTELY MONITORING THE LOCATION AND USAGE HISTORY OF RADIOACTIVE MATERIALS STORED WITH A SHIELDED CONTAINER OR OVERPACK". The present application hereby claims priority under 35 U.S.C. §119(e) to U.S. Provisional Patent No. 61/000,403.

TECHNICAL FIELD OF THE INVENTION

The present application relates generally to remote tracking systems and, more specifically, to a system and method for tracking and monitoring of radioactive materials.

BACKGROUND OF THE INVENTION

Radioactive materials are used in many fields, such as energy development, hydrocarbon exploration, medical and scientific research. In hydrocarbon exploration, specifically the drilling, evaluating, and production of oil & gas wells, the use of radioactive materials such as Cesium-137 or Americium-241 Berylium is common.

In an exemplary application, the radioactive source is located inside a carrier disposed within a downhole tool, such as a wireline logging, measurements-while-drilling ("MWD"), or logging-while-drilling ("LWD") tool. The downhole tool is passed through a borehole penetrating a geological formation of interest. One conventional technique involves irradiating the formation with high-energy neutrons and monitoring the resulting energy spectra. The resulting energy spectra generally are indicative of characteristics of the formation. A radioactive source carrier is secured in a radiation shielded container when the radioactive source carrier is not inside the downhole tool.

A shielded container, referred to as a shield, is designed to absorb a significant portion of the ionizing radiation that is emitted from the radioactive source when the radioactive source is being stored, transported or otherwise not in use. Typically, a radioactive source spends the majority of its useful life stored in a shielded container. The radioactive source is removed occasionally either for its intended purpose or for routine inspections, physical inventories, calibrations, cleanings and other operations.

One or more shielded containers, containing radioactive sources, may be packaged within a larger container referred to as an overpack. An overpack is a container used for transporting cylinders not meeting shipping regulations, such as the regulations of the United States Department of Transportation. Therefore, the overpack is a container into which one or more cylinders would be placed for shipment. For example, one or more shielded containers may be packaged in the overpack while being transported from one location to another, such as from a base of operations to a job site. A metal overpack is designed, tested, and certified to meet all shipping requirements and would be suitable to contain, transport and store cylinder contents, regardless of cylinder condition.

Security and human health issues associated with radioactive materials lead to specific procedures that are intended to reduce human exposure to radiation, record radioactive source location, record radioactive source usage, perform physical radioactive source inventories, and ensure that sources are returned to the shielded container after each use. Much of these existing procedures presently rely on human involvement.

Additionally, numerous parties are involved in the handling of the radioactive source. The radioactive source, when not in use, is stored at a storage facility managed by a first party. When needed for energy exploration (or other purpose), the radioactive source is removed from storage and transported to the exploration site by a transportation party. In some cases, the exploration site is offshore. In such cases, the radioactive source is transported to a dock where a dock authority manages possession of the radioactive source. Thereafter, the radioactive source is transported by ship to the exploration site. Accordingly, multiple different parties handle the radioactive source, contained within the shield. Each party handling the radioactive source must manage, closely, multiple safety and reporting requirements associated with handling radioactive materials.

Therefore, there is a need in the art for an improved ability to inventory and track radioactive sources. In particular, there is a need for a device that is capable of remotely inventorying radioactive sources, tracking radioactive source locations and recording source usage.

SUMMARY OF THE INVENTION

An apparatus for recording and reporting information regarding a shielded container for radioactive sources is provided. The apparatus includes a wireless communications device, a geographic positioning system ("GPS") device and a processor. The apparatus includes radiation sensor configured to detect the presence of a first radioactive source located inside the shielded container.

A system for recording and reporting information regarding a shielded container for radioactive sources is provided. The system includes an insulating material disposed around an inner cavity. The system includes a processor, a gps device and a radiation sensor configured to detect the presence of a radioactive source within the inner cavity. The system further includes a wireless communications device configured to receive and transmit information.

A method for recording and reporting information regarding a shielded container for radioactive sources is provided. The method includes detecting a presence of the radioactive source contained within the shielded container. The method further includes determining a location of the shielded container. The method also includes transmitting a message indicating a location of the shielded container, an identifier of the shielded container and an indication of whether or not the shielded container includes the radioactive source.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller"

means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged radioactive material storage or transportation container.

Figure 1:
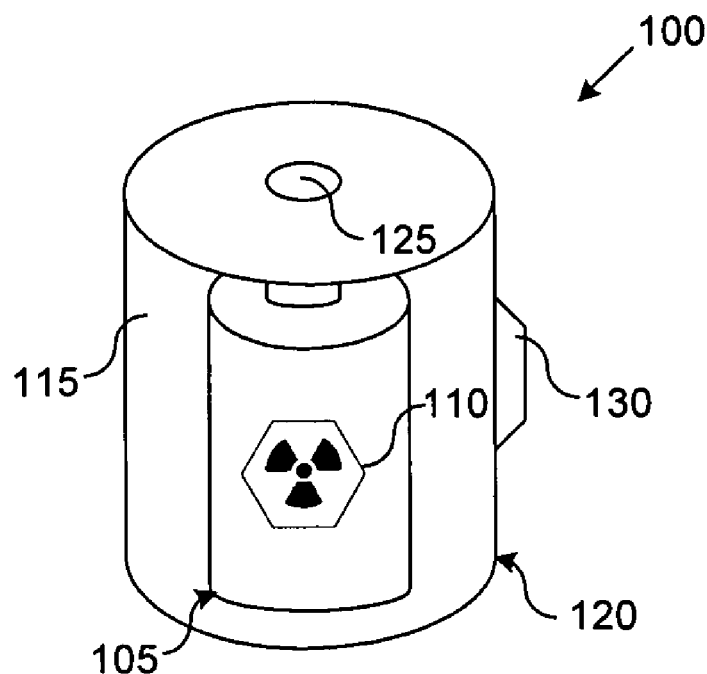
FIG. 1 illustrates a shielded container 100 according to embodiments of the present disclosure.

FIG. 1 illustrates a shielded container 100 according to embodiments of the present disclosure. The embodiment of the shielded container 100 shown in FIG. 1 is for illustration only. Other embodiments of the shielded container 100 could be used without departing from the scope of this disclosure. The shielded container 100 is configured to conform to Nuclear Regulatory Commission ("NRC") requirements. The NRC's regulations are found in Chapter I of Title 10, "Energy," of the Code of Federal Regulations (CFR).

The shielded container 100 includes an inner cavity 105 adapted to house a radioactive source 110. The radioactive source 110 can be any radioactive material known and regulated by the NRC for use in industrial applications, such as, but not limited to, Cesium-137 or Americium-241 Berylium. The inner cavity 105 is surrounded by material operable to inhibit the communication of radioactive particles, such as alpha, gamma and beta particles, from the inner cavity 105 to portions outside the shielded container 100. The insulating material 115 comprises any suitable radiation inhibiting material, such as lead. In some embodiments, the insulating material 115 can be a plurality of layers, or cylinders, disposed around the inner cavity 105. The shielded container also includes an exterior shell 120. The exterior shell 120 provides a protective surface for the shielded container 100.

Access to the inner cavity 105 is provided by a cavity cap 125. The cavity cap 125 is adapted to be removed to access the inner cavity 105. Additionally, in a closed position, the cavity cap 125 is adapted to form a seal with at least one of the exterior shell 120 and insulating material 115 of the shielded container 100 to inhibit the communication of radioactive particles from within the inner cavity 105 to areas outside the shielded container 100.

Figure 2:
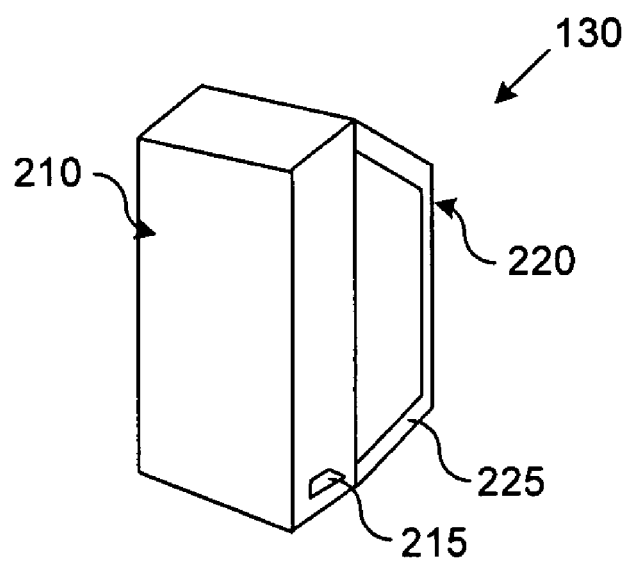
FIG. 2 illustrates an exemplary Radiation Source Container Tracking device according to embodiments of the present disclosure.

The shielded container 100 includes a Radiation Source Container Tracking device ("RSC") 130. The RSC 130 is adapted to be attached to the shielded container 100. An attachment interface 210, illustrated on FIG. 2, is affixed to the shielded container 100 by an attachment means as is known in the art, such as, but not limited to, screws, adhesive glue, plastic or metal welds, or other bonding methods. The embodiment of the RSC 130 shown in FIG. 2 is for illustration only. Other embodiments of the RSC 130 could be used without departing from the scope of this disclosure. The RSC 130 is placed on the exterior shell 120 of the shielded container such that sensors in the RSC 130 are operable to detect a presence of the radioactive source 110 within the inner cavity.

In some embodiments, the shielded container 100 is manufactured with the RSC 130 contained within the insulating material 115. In some embodiments, the shielded container 100 is manufactured with the RSC 130 forming a portion of the insulating material 115 and exterior shell 120. In yet another embodiment, the RSC 130 is disposed within the cavity cap 120.

The RSC 130 includes circuitry configured to detect the presence of the radioactive source 110. The RSC 130 circuitry is further operable to record information regarding the shielded container 100 and radioactive source 110. The information recorded by the RSC 130 includes, but is not limited to, geographic location information, identification information, radiation level information, radiation type information, maintenance type, handling procedures and emergency response documentation. It would be understood that the listing of information recorded is exemplary. Other types of information, and different combinations of information (e.g., only recording identification information) can be recorded without departing from the scope of this disclosure.

In some embodiments, the RSC 130 includes circuitry configured to determine a location of the shielded location 100. In such embodiments, the RSC 130 is operable to receive at least one of geographic location information, location identification information, and vehicle identification information.

In some embodiments, the RSC 130 includes an interface port 215. The interface port 215 is configured to receive command messages from an external device (discussed in further detail with respect to FIG. 9). In some embodiments, the interface port 215 also is configured to transmit messages to an external device. In some embodiments, the interface port 215 is a hardwire port adapted to couple with the external device via an interface cable. In some embodiments, the interface port 215 is an infrared port adapted to couple with the external device via infrared signals. In some embodiments, the interface port 215 is a wireless port, such as a wireless fidelity ("wifi") interface, adapted to couple with the external device via wireless communications.

The RSC 130 includes an exterior surface 220. The exterior surface 200 comprises a plastic or suitable material adapted to protect the RSC 130 circuitry from external elements. In some embodiments, the exterior surface 220 includes an RSC insulating material 225. The RSC insulating material 225 comprises any suitable radiation inhibiting material, such as lead. The RSC insulating material 225 is disposed around a portion of the RSC 130 exposed to areas outside the shielded container 100 (e.g., surfaces of the RSC 130 other than the attachment interface 210). As such, the RSC insulating material 225 is configured to inhibit the RSC 130 from detecting radioactive particles in areas outside the shielded container 100.

The RSC 130 includes circuitry configured to detect a motion of the shielded container 100. As such, the RSC 130 is configured to determine if the shielded container 100 is being transported. Additionally, the RSC 130 is configured to store information regarding the detection of movement (e.g., the RSC 130 can store when the shield container 100 was moved, for how long it was moved).

Figure 3:
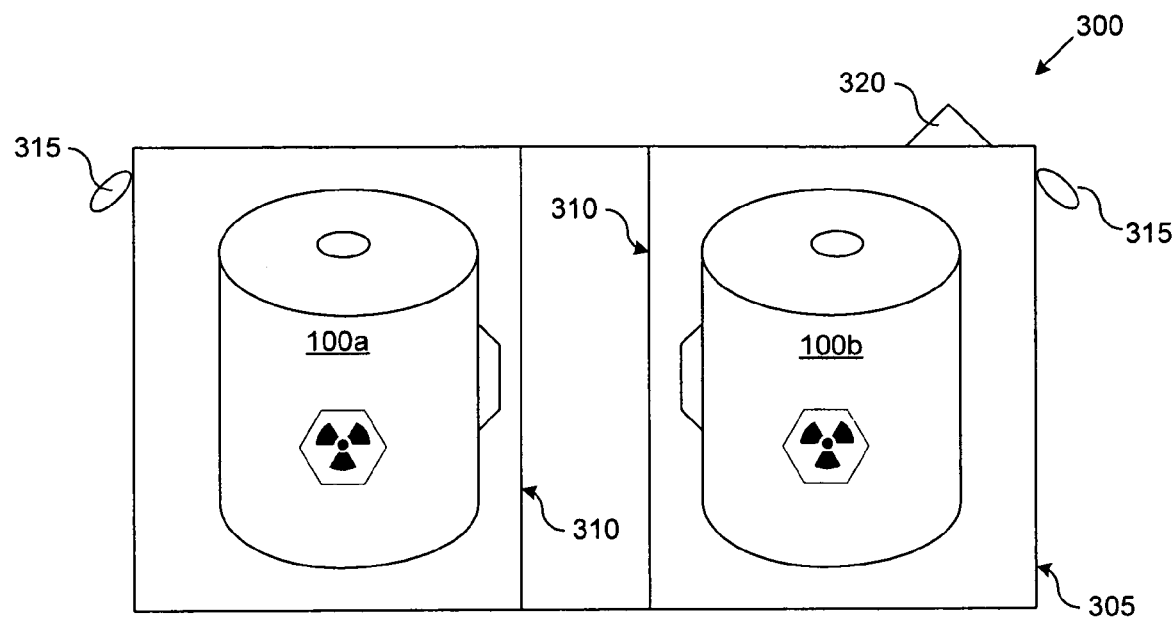
FIG. 3 illustrates a simple diagram of two shielded containers with radioactive sources packed in an overpack according to an exemplary embodiment of the disclosure.

Referring now to FIG. 3, two exemplary shielded containers 100 located within an overpack 300 according to embodiments of the present disclosure are illustrated. The embodiment of the overpack 300 shown in FIG. 3 is for illustration only. Other embodiments of the overpack 300 could be used without departing from the scope of this disclosure.

The overpack 300 is dimensioned to house at least two shielded containers 100a and 100b. The overpack 300 includes an outer shell 305. The outer shell 305 comprises materials, such as metal or composites, suitable to protect the shielded containers 100a and 100b from external elements. In some embodiments, the overpack 300 includes one or more interior partitions 310. The outer shell 305 and the interior partitions 310 are configured to provide one or more surfaces for inhibiting movement of the shielded containers 100a and 100b housed in the overpack 300.

The overpack 300 includes one or more mounting attachments 315. The mounting attachments 315 are operable to provide coupling positions to lift the overpack 300 or secure the overpack 300 to a surface (e.g., to secure the overpack 300 to a truck or ship for transport).

In some embodiments, the outer shell 305 comprises material that inhibits the transmission of wireless communications. In such embodiments, the RSC 130 on each of the shielded containers 100a and 100b is unable to transmit and receive messages from outside the overpack 300. For example, a user seeking to receive a report from the RSC 130 on a first shielded container 100a would be unable to communicate with the first shielded container 100a while the first shield container 100a is housed within the overpack 300. In such embodiments, the overpack includes a relay transceiver device ("RTD") 320.

The RTD 320 includes circuitry configured to receive signals from the shielded containers 100a and 100b. Additionally, the RTD 320 includes circuitry configured to transmit signals to a central facility (discussed in further detail with respect to FIG. 9). In some embodiments, the RTD 320 includes circuitry configured to transmit identification information to the shielded containers 100a and 100b. In additional embodiments, the RTD 320 includes circuitry configured to receive, and respond to, signals from at least one of the user and the central facility. In yet still additional embodiments, the RTD 320 circuitry further is configured to store information regarding at least one of the overpack 300 and the shielded containers 100a and 100b. The information stored by the RTD 320 circuitry includes, but is not limited to, geographic location information, identification information, radiation level information, radiation type information, maintenance type, handling procedures and emergency response documentation. It would be understood that the listing of information recorded is exemplary. Other types of information, and different combinations of information (e.g., only recording identification information) can be recorded without departing from the scope of this disclosure.

In one example of the operation of the RTD 320, a truck (discussed in further detail with respect to FIG. 9) transports the overpack 300 from a storage facility (discussed in further detail with respect to FIG. 9) to a dock facility (not illustrated). When the truck arrives at the dock facility, dock personnel seek to know what is in the overpack 300 for proper manifesting. Accordingly, the dock personnel, using an external device (discussed in further detail with respect to FIG. 9) query the RTD 320. The external device queries the RTD 320 by sending signals to the RTD 320 requesting identifier information regarding the shielded containers 100a and 100b. In one embodiment, the RTD 320 transmits serialized identifier numbers ("serial numbers") for each of the shielded containers 100a and 100b. The RTD 320 had previously stored the serial numbers for the shielded containers 100a and 100b. In yet another embodiment, in response to the query, the RTD 320 queries the shielded containers 100a and 100b for the serial numbers. The shielded containers 100a and 100b respond by transmitting the serial numbers to the RTD 320. Thereafter, the RTD 320 transmits the serial numbers to the external device. Additionally, the RTD 320 may also transmit handling instructions and emergency response documentation.

The RTD 320 includes circuitry configured to detect a motion of the overpack 300. As such, the RTD 320 can determine if the overpack 300 is being transported. Additionally, the RTD 320 is configured to store information regarding the detection of movement (e.g., the RTD 320 can store when the shield container 100 was moved, for how long it was moved).

In some embodiments, the RTD 320 includes circuitry for internal power (e.g., a battery). In additional embodiments, the RTD 320 includes circuitry adapted to interface with an external local power source. In such embodiments, the RTD 320 includes power transformation and regulation circuitry adapted to interface with at least one of alternating current from a distributed power system (e.g., 110 Volt power source), a generated power source such as an electrical generator, and a power supply from a vehicle transporting the overpack 300.

Figure 4:
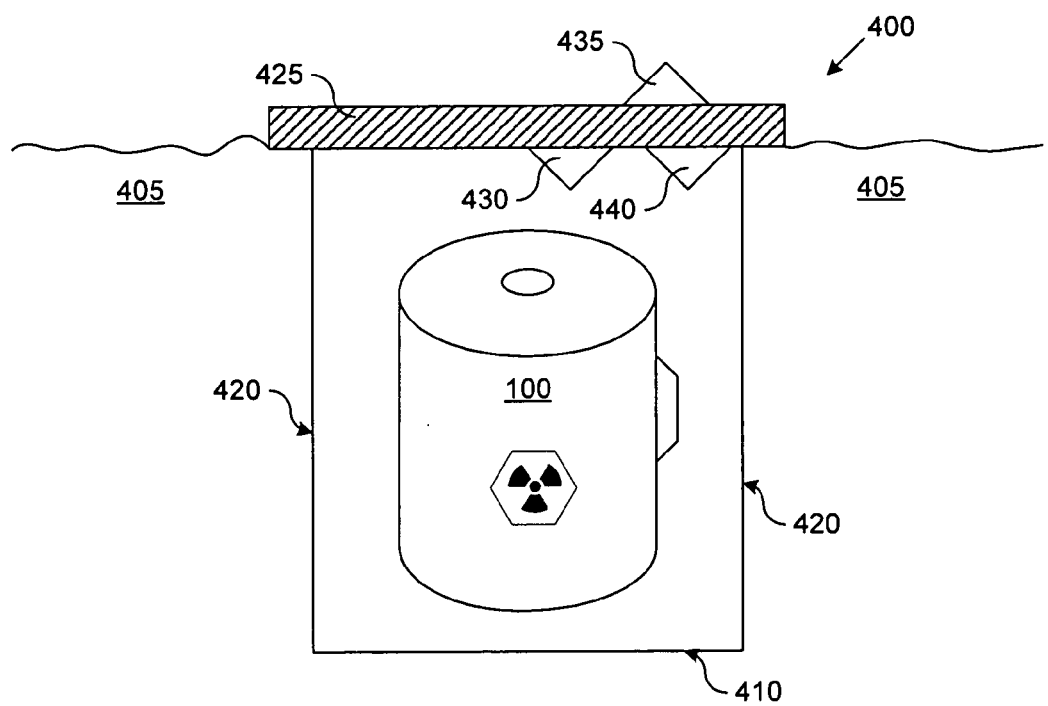
FIG. 4 illustrates a simple diagram of a radioactive source located in a storage pit according to an exemplary embodiment of the disclosure.

FIG. 4 illustrates a simple diagram of a shielded container 100 located in a storage pit 400 according to an exemplary embodiment of the disclosure. The embodiment of the storage pit 400 shown in FIG. 4 is for illustration only. Other embodiments of the storage pit 400 could be used without departing from the scope of this disclosure.

The storage pit 400 is dimensioned to store at least one shielded container 100. In some embodiments, two or more shielded containers 100 are stored in the storage pit 400. In some embodiments, the overpack 300 housing at least one shielded container 100 is stored in the storage pit 400.

In one embodiment, the storage pit 400 is a cavity created in the ground 405. The storage pit 400 comprises a floor and walls 420. The floor and walls 420 comprise any suitable radiation inhibiting material, such as concrete and lead. The storage pit 400 includes a storage pit lid 425. The storage pit lid 425 comprises any suitable radiation inhibiting material, such as lead and concrete.

In some embodiments, the storage pit 400 includes a passive transponder 430. The passive transponder 430 can be any device capable of responding with an identifier when queried, such as a radio frequency identifier (RFID). The passive transponder 430 includes a storage pit identifier associated with the storage pit 400. The storage pit identifier is operable to provide information regarding the storage pit, such as, but not limited to, a storage pit serial number and a storage pit geographic location. In such embodiment, when the shielded container 100 is placed inside the storage pit 400, the RSC 125 sends a signal to the passive transponder 430. The signal is operable to power the passive transponder 430. In response to receiving the signal, the passive transponder 430 transmits the storage pit identifier to the RSC 125.

Thereafter, the RSC 125 transmits a message to the central facility. The message may be transmitted via wireless (e.g., cellular) communication or via a satellite communication. In some embodiments, the RSC 125 couples to an external modem (not illustrated) such that the RSC 125 transmits the message to the central facility via the modem through a wireline communication. The transmitted message includes information regarding the shielded container 100 such as, but not limited to, the serial number of the shielded container 100, whether or not the shielded container contains a radioactive source, and the storage pit identifier in which the shielded container 100 is stored.

In some embodiments, the storage pit lid 425 comprises highly absorptive materials such that wireless communications through the storage pit lid 425 are inhibited. In such embodiments, the storage pit includes an RTD 435. RTD 435 can be like RTD 320. In some embodiments, the RTD 425 includes circuitry for internal power (e.g., a battery). In additional embodiments, the RTD 425 includes circuitry adapted to interface with an external local power source. In such embodiments, the RTD 425 includes power transformation and regulation circuitry adapted to interface with alternating current from a distributed power system (e.g., 110 Volt power source).

The RTD 435 includes circuitry configured to receive signals from at least one of the overpack 300 and the shielded containers 100a and 100b. Additionally, the RTD 435 includes circuitry configured to transmit signals to the central facility. In some embodiments, the RTD 435 includes circuitry configured to transmit storage pit identification information to the shielded containers 100a and 100b. In additional embodiments, the RTD 435 includes circuitry configured to receive, and respond to, signals from at least one of the user and the central facility. In yet still additional embodiments, the RTD 435 circuitry further is configured to store information regarding at least one of the storage pit 400, the overpack 300 and the shielded containers 100a and 100b. The information stored by the RTD 435 circuitry includes, but is not limited to, geographic location information, identification information, radiation level information, radiation type information, maintenance type, handling procedures and emergency response documentation. It would be understood that the listing of information recorded is exemplary. Other types of information, and different combinations of information (e.g., only recording identification information) can be recorded without departing from the scope of this disclosure.

In additional embodiments, the storage pit 400 includes a relay beacon 440. The relay beacon 440 is configured to receive signals from outside the storage pit 400 (e.g, from the RTD 435 or from an external device) and relay them to devices inside the storage pit 400 (e.g., to the shielded containers 100a and 100b or the overpack 300). The relay beacon 440 further is configured to receive signals from inside the storage pit 400 (e.g., from the shielded containers 100a and 100b or the overpack 300) and relay them to the device outside the storage pit 400 (e.g, the RTD 435 or an external device).

Figure 5:
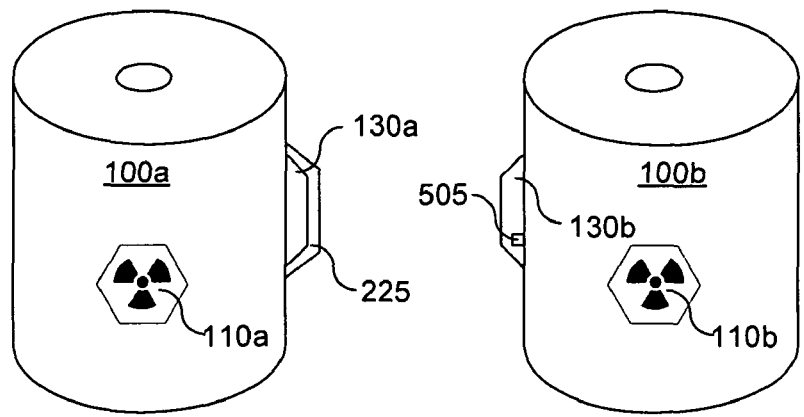
FIG. 5 illustrates a simple diagram of two shielded containers, with radioactive sources, located in proximity to each other according to an exemplary embodiment of the disclosure.

FIG. 5 illustrates two shielded containers 100a and 100b in proximity to each according to embodiments of the present disclosure. The embodiment of the two shielded containers 100a and 100b shown in FIG. 5 is for illustration only. Other embodiments of the two shielded containers 100a and 100b could be used without departing from the scope of this disclosure.

Although the insulating material 115 in the shielded containers 100 is effective towards inhibiting the communication of radioactive particles from the inner cavity 105 to areas outside the shielded container 100, some radioactive particles may still "leak" out of the shielded container 100.

As stated hereinabove with respect to FIGS. 1 and 2, the RSC 130 is configured to detect the presence of the radioactive source 110. The RSC 130 is configured to detect the radioactive source 110 when the radioactive source 130 is within a proximity to the RSC 130. The RSC 130 is configured to detect alpha particles, beta particles and gamma particles.

Alpha particles are a type of radiation that do not travel very far, do not pass through anything very thick, and can generally be absorbed or stopped by an inch or less (1-2 centimeters) of air or a thin piece of tissue. Alpha particles lose all of their energy in a small volume. Examples of radioactive materials that give off alpha particles are polonium-210, radon-222, radium-226, and americium-241.

Beta particles are electrons at high speed emitted from an atom. In air, beta particles can travel a few hundred times farther than alpha particles-up to six feet (two meters) or more for those having high energy. In most cases, for the common beta emitters used in laboratories, light clothing or a couple inches (few centimeters) of air can stop the beta radiation. Examples of radioactive materials that give off beta particles are hydrogen-3 (tritium), carbon-14, phosphorus-32, and sulfur-35.

Gamma and x rays (also called photons) are waves of energy that travel at the speed of light. These waves can have considerable range in air and have greater penetrating power (can travel farther) than either alpha or beta particles. X rays and gamma rays differ from one another because they come from different locations in an atom. Gamma rays come from the nucleus of an atom while x rays come from the electron shells. Even though x rays are emitted by some radioactive materials, they are more commonly generated by machines used in medicine and industry.

Gamma and x rays are both generally blocked by various thicknesses of lead or other heavy materials. Examples of common radionuclides that emit gamma rays are technetium-99m (the most commonly used radioactive material in nuclear medicine), iodine-125, iodine-131, cobalt-57, and cesium-137.

Accordingly, when the user places the radioactive source 110 in the inner cavity 105, the RSC 130 detects the presence of the radioactive source 110. Additionally, the RSC 130 may detect the radioactive particles (e.g., alpha, beta or gamma) particles from emitted from a source in proximity to the RSC 130.

In some embodiments, a first RSC 130a includes insulating material 225. The insulating material 225 provides a radioactive shielding for a portion of the first RSC 130a not adjacent (e.g., facing) the shielded container 100*a*. The insulating material 225 is disposed around the first RSC 130*a* such that radioactive particles emitted from a first radioactive source 110*a* can be detected by the first RSC 130*a*. Further the insulating material 225 is disposed around the first RSC 130*a* such that the first RSC 130*a* does not detect radioactive particles emitted from a second radioactive source 110*b* in proximity to the first RSC 130*a*.

Figure 6:
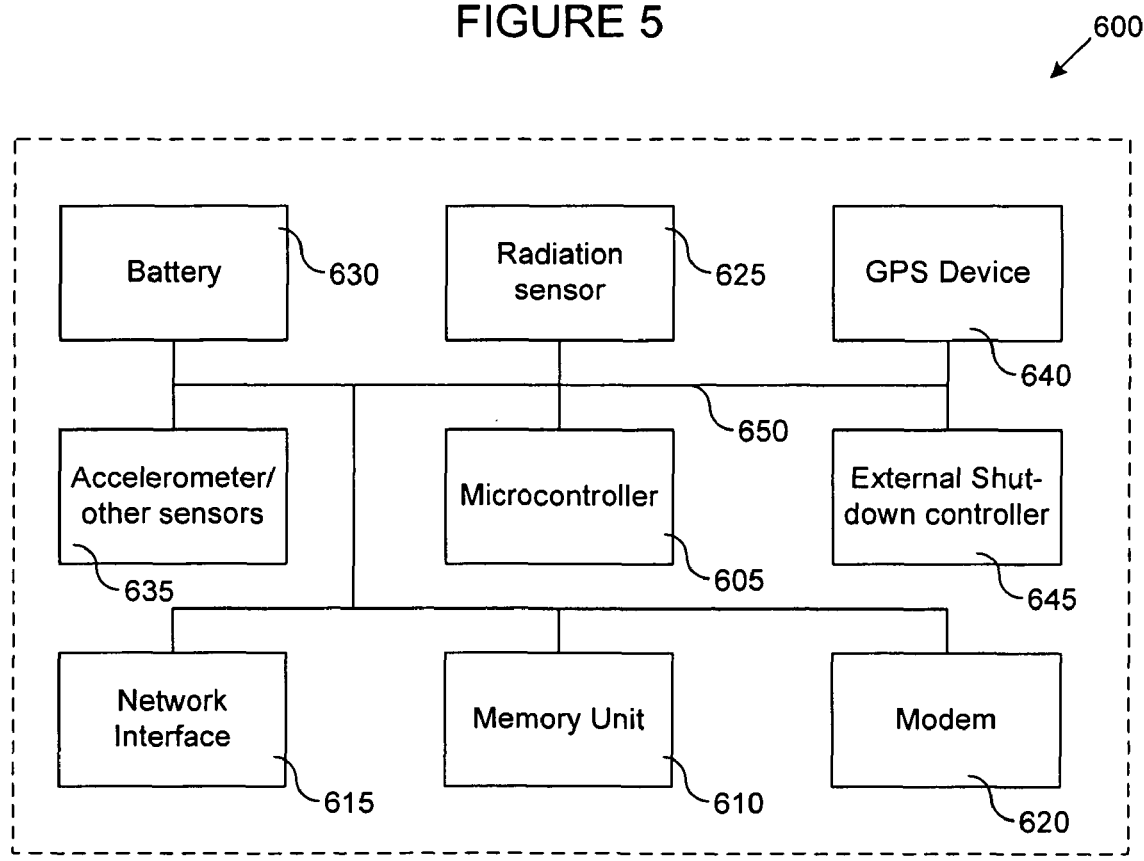
FIG. 6 is a simple block diagram of a radioactive tracking and reporting device according to an exemplary embodiment of the present disclosure.

In some embodiments, a second RSC 130*b* includes insulating material 505 disposed around a radiation sensor (discussed in further detail herein with respect to FIG. 6). In such embodiment, the insulating material 505 provides a radioactive shielding for a portion of the radiation sensor not facing the shielded container 110*b*. The insulating material 505 is disposed around the radiation sensor of the second RSC 130*b* such that radioactive particles emitted from the second radioactive source 110*b* can be detected by the second RSC 130*b*. Further the insulating material 505 is disposed around the radiation sensor of the second RSC 130*b* such that the second RSC 130*b* does not detect radioactive particles emitted from the first radioactive source 110*a* in proximity to the second RSC 130*b*.

Therefore, when the first shielded container 100*a* is placed in proximity to the second shielded container 100*b*, the first RSC 130*a* detects the first radioactive source 110*a* contained in the first shielded container 100*a* but does not detect the presence of the second radioactive source 110*b* contained in the shielded container 100*b*. Further, the second RSC 130*b* detects the second radioactive source 110*b* but does not detect the first radioactive source 110*a*.

Referring now to FIG. 6, a simple block diagram of a RSC 130 according to embodiments of the present disclosure is illustrated. The embodiment of the RSC 130 shown in FIG. 6 is for illustration only. Other embodiments of the RSC 130 could be used without departing from the scope of this disclosure.

The RSC 130 includes a microcontroller 605, a memory unit 610, a network interface 615, a modem 620, a radiation sensor 625, a battery 630, an accelerometer and other sensors 635, a GPS device 620, and an external shut-down controller 645. It is understood that the RSC 130 may be differently configured and that each of the listed components may actually represent several different components. The components are interconnected by one or more communication links 650 (e.g., a bus).

The microcontroller 605 may actually represent a multi-processor or a distributed processing system. The microcontroller 605 is configured to utilize a plurality of instructions stored in the memory unit 610 and connections to the network interface 615, the modem 620, the radiation sensor 625, the battery 630, the accelerometer and other sensors 635, and the GPS device 620.

The memory unit 610 may include different levels of cache memory, main memory, hard disks, remote storage locations, and storage means such as any computer readable medium. For example, the storage means can be any electronic, magnetic, electromagnetic, optical, electro-optical, electro-mechanical, and/or other physical device that can contain, store, communicate, propagate, or transmit a computer program, software, firmware, or data for use by the microcontroller 605 or other computer-related system or method. The memory unit 610 includes a plurality of instructions for use by the microcontroller 605. Additionally, the memory unit includes information related to the radioactive source 110 and shielded container 100. The information related to the radioactive source 110 and shielded container 100 includes maintenance history and emergency handling procedures. The information related to the shielded container 100 includes maintenance history and emergency handling procedures.

The network interface 615 may include monitors, keyboards, and the like. The network interface 615 also includes at least one of an RFID, wifi interface, Zigbee or one or more network interface cards (NICs) that are each associated with a media access control (MAC) address.

The battery 630 provides a power supply for use by one or more of the components. The battery 630 can be Lead-acid; Nickel-iron (Ni-iron); Nickel-cadmium (Ni-cadmium); Nickel Metal Hydride (NiMH); Nickel-zinc (Ni-zinc); Lithium ion (Li-ion); Li-ion polymer; Li-ion Phosphate; Li-sulfur; Nano Titante; Thin Film Lithium; Zinc bromide; Sodium-sulfur (NaS); Molten salt; Super iron; Silver zinc; rechargeable alkaline; and a non-chemical such as Iron-Sulfur (FeS). The battery 630 is operable to provide electrical power to each of the components of the RSC 130. Additionally, the battery 630 includes appropriate sensors and logic necessary to provide a battery provide a power level indication to the microcontroller 605. As such, the microcontroller 605 is configured to report an occurrence of the battery 630 power level dropping below a specified threshold. In some embodiments, the microcontroller 605 reports the measured power level of the battery 630.

The radiation sensor 625 can be any of an ionization chamber, proportional counter, Geiger counter, scintillation sensor, and solid state nuclear radiation sensor. In some embodiments, the radiation sensor 625 includes an active reader configured to receive a signal from a transmitter disposed on the radioactive source 110. In such embodiments, the radiation sensor 625 is configured to identify the radioactive source 110 as well as detect the presence, or absence, of the radioactive source 110 within the shielded container 100.

In one such embodiment, the radiation sensor 625 includes an active RFID reader. In such embodiment, the radioactive source 110 includes an RFID transponder. In another such embodiment, the radiation sensor 625 includes active surface acoustic wave (SAW) device. In such embodiment, the radioactive source 110 includes a SAW device. In yet another such embodiment, the radiation sensor 625 includes a RuBee™ transceiver device. In such embodiment, the radioactive source 110 includes a RuBee™ transceiver device.

In some embodiments, the radiation sensor 625 is coupled to the active reader. In some embodiments, the radiation sensor 625 is a single component including the active reader and at least one of an ionization chamber, proportional counter, Geiger counter, scintillation sensor, and solid state nuclear radiation sensor.

The GPS device 640 includes a GPS chipset, an antenna and a receiver. The GPS device 640 is configured to receive timing signals from a plurality of satellites. The GPS device 640 calculates a geographic position of the GPS device 640 based on the received timing information. The accelerometer 635 is a device for measuring acceleration and gravity induced reaction forces. The accelerometer 635 can be a single-axis or multi-axis model configured to detect magnitude and direction of the acceleration as a vector quantity. In additional embodiments, the accelerometer 635 comprises a processor configured to receive information from the GPS device 640. In such embodiments, the accelerometer 635 is configured to determine a motion of the shielded container 100 based on a change in the information received from the GPS device 640. The modem 620 can be a wireless cellular modem configured to communicate via a wireless (e.g., radio frequency such as, but not limited to, code division multiple access, frequency division multiple access and time division multiple access) communication medium. Additionally, the modem 620 can be a satellite modem configured to communicate via satellite communications. The external shutdown controller 645 is configured to receive commands from a user, via an external keypad or the network interface 615, to shut down the RSC 130.

Figure 7:
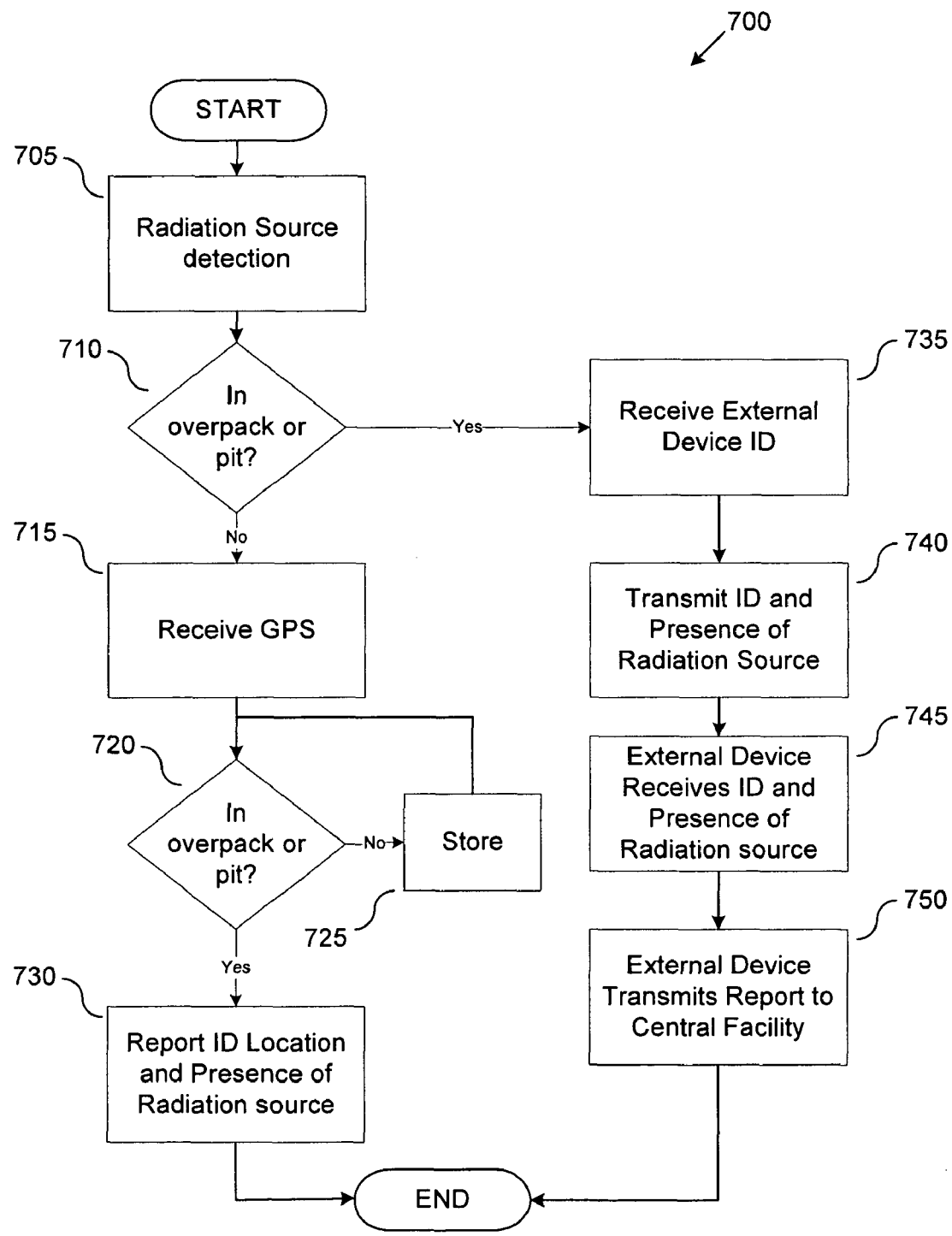
FIG. 7 illustrates a simple flow diagram 700 of operation of the RSC according to embodiments of the present disclosure.

FIG. 7 illustrates a simple flow diagram 700 of operation of the RSC according to embodiments of the present disclosure. The embodiment of the operation of the RSC 130 shown in FIG. 7 is for illustration only. Other embodiments of the operation of the RSC 130 could be used without departing from the scope of this disclosure.

In step 705, the RSC 130 detects the presence of the radioactive source 110 in the shielded container 100. The RSC 130 either detects that the radioactive source 110 is contained within the shielded container 100 or that there is no radioactive source 110 contained within the shielded container 100. The RSC 130 stores the determination of the radioactive source 110 in the memory unit such that a radiation source record is created establishing when the radioactive source 110 is present in the shielded container 100. Additionally, the radiation source record establishes when the radiation source is not present in the shielded container 100.

In step 710, the RSC 130 determines that the shielded container 100 is housed within the overpack 300 or stored within the storage pit 400. The RSC 130 receives a beacon signal from either the RTD 320 on the overpack 300 or passive transponder 430 in the storage pit. Alternatively, the RSC 130 receives the beacon signal from the RTD 435 of the storage pit. The beacon signal includes an external identifier ("external ID"). The external ID is either an overpack identifier for the overpack 300 or a storage pit identifier for the storage pit 400. The identifier may be serialized number that is uniquely associated to the overpack 300 or the storage pit 400 respectively. When the RSC 130 receives the beacon signal from the overpack 300, the RSC 130 determines that the shielded container 100 is housed within the overpack 300. When the RSC 130 receives the beacon signal from the storage pit 400, the RSC 130 determines that the shielded container is stored within the storage pit 400. Additionally, the RSC 130 may receive beacon signals from both the overpack 300 and the storage pit 400 such that the RSC 130 determines that the shielded container 100 is housed within the overpack 300 stored in the storage pit 400.

If the RSC 130 determines that the shielded container is not in one of the overpack 300 or the storage pit 400, the RSC 130 receives GPS information in step 715. The RSC 130 receives timing information from one or more satellites. The RSC 130 calculates a geographic location corresponding to the received GPS information. The RSC 130 stores the geographic location in memory unit 610. The geographic location is stored with the radiation source record to represent a geographic location of the shielded container as a particular instant in time.

In step 720, the RSC 130 seeks to establish a communication with a central facility. The RSC determines if a communication path is available (e.g., is a base station in a proximity such that a wireless signal can be established). This may also occur when the shielded container 100 is housed in a overpack 300 or a storage pit 400 that does not transmit the beacon with the overpack 300/storage pit 400 identifier. If no communication path is available, the RSC 130 creates and stores a radiation source report in step 725. The radiation source report can include a shielded container identifier ("ID"), an entry stating when the radioactive source 110 was detected in the shielded container and the geographic location of the shielded container 100. The shielded container ID is an identifier that is uniquely associated to the shielded container 100. Thereafter, the RSC 130 continues to seek establish a communication with the central facility at period intervals.

If the RSC 130 is able to establish the communication with the central facility in step 720, the RSC 130 transmits the shielded container ID, a report indicating when the radioactive source 110 was detected in the shielded container and the geographic location of the shielded container 100. Additionally, the RSC 130 transmits any stored radiation source reports.

If the shielded container 100 is housed in at least one of the overpack 300 and the storage pit 400 in step 710, the RSC 130 receives the external ID in step 735. In response, the RSC 130 transmits the shielded container 100 ID and a report indicating whether or not the presence of the radioactive source 110 was detected in step 740.

In step 745, an external device receives the transmission from the RSC 130. The external device can be the RTD 320 on the overpack 300, the RTD 435 on the storage pit 400 or another relay transmission device located in close proximity to the overpack 300 housing the shielded container 100 or storage pit 400 storing the shielded container 100.

Thereafter, the external device transmits the information received from the RSC 130 (e.g. the radiation source report) to the central facility in step 750. The external device includes a geographic location of the external device. For example, if the external device is the RTD 320 on the overpack 300, the RTD 320 receives GPS information of the overpack 300. The RTD 320 includes the GPS information with the information received from the RSC 130. In some embodiments, the RTD 320 includes the overpack 300 identifier with the information received from the RSC 130. Additionally, if the external device is the RTD 435 on the storage pit, the RTD 435 includes the storage pit 400 identifier with the information received from the RSC 130.

Figure 8:
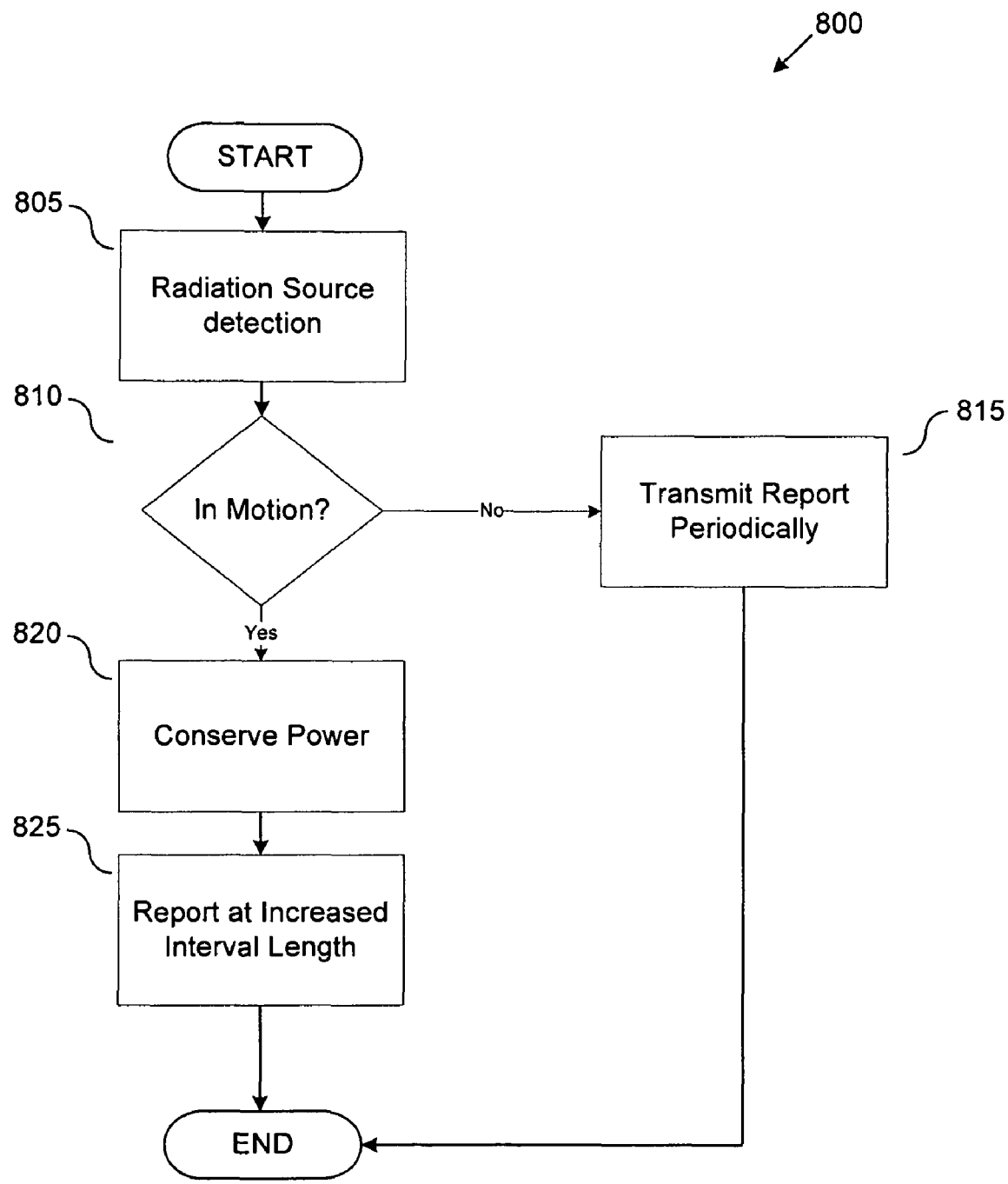
FIG. 8 illustrates a simple flow diagram of a motion determination process according to embodiments of the present disclosure.

FIG. 8 illustrates a simple flow diagram of a motion determination process according to embodiments of the present disclosure. The embodiment of the operation of the RSC 130 shown in FIG. 8 is for illustration only. Other embodiments of the operation of the RSC 130 could be used without departing from the scope of this disclosure. Additionally, embodiments of the present disclosure provide for similar processes incorporated in the RTD 320 of the overpack 300.

In step 805, the RSC 130 detects the presence of the radioactive source 110. If the RSC 130 is not in motion, e.g., no motion detected in step 810, the RSC 130 transmits the radiation source report at periodic intervals (e.g., once every 5 seconds, once every minute, or some other specified interval).

If the RSC 130 determines that the shielded container 100 is in motion in step 810, the RSC 130 determines that a power conservation mode should be incorporated in step 820. In one embodiment, the RSC 130 shuts down one or more components. The RSC 130 adjusts the periodic intervals in which the RSC 130 transmits the radiation source report. The RSC 130 reduces the number of transmissions by increasing the periodic interval. For example, if the periodic interval was initially set such that the RSC 130 transmits the radiation source report once every five seconds, the RSC 130 would adjust the periodic interval such that the RSC 130 transmits the radiation source report once every three minutes.

Figure 9:
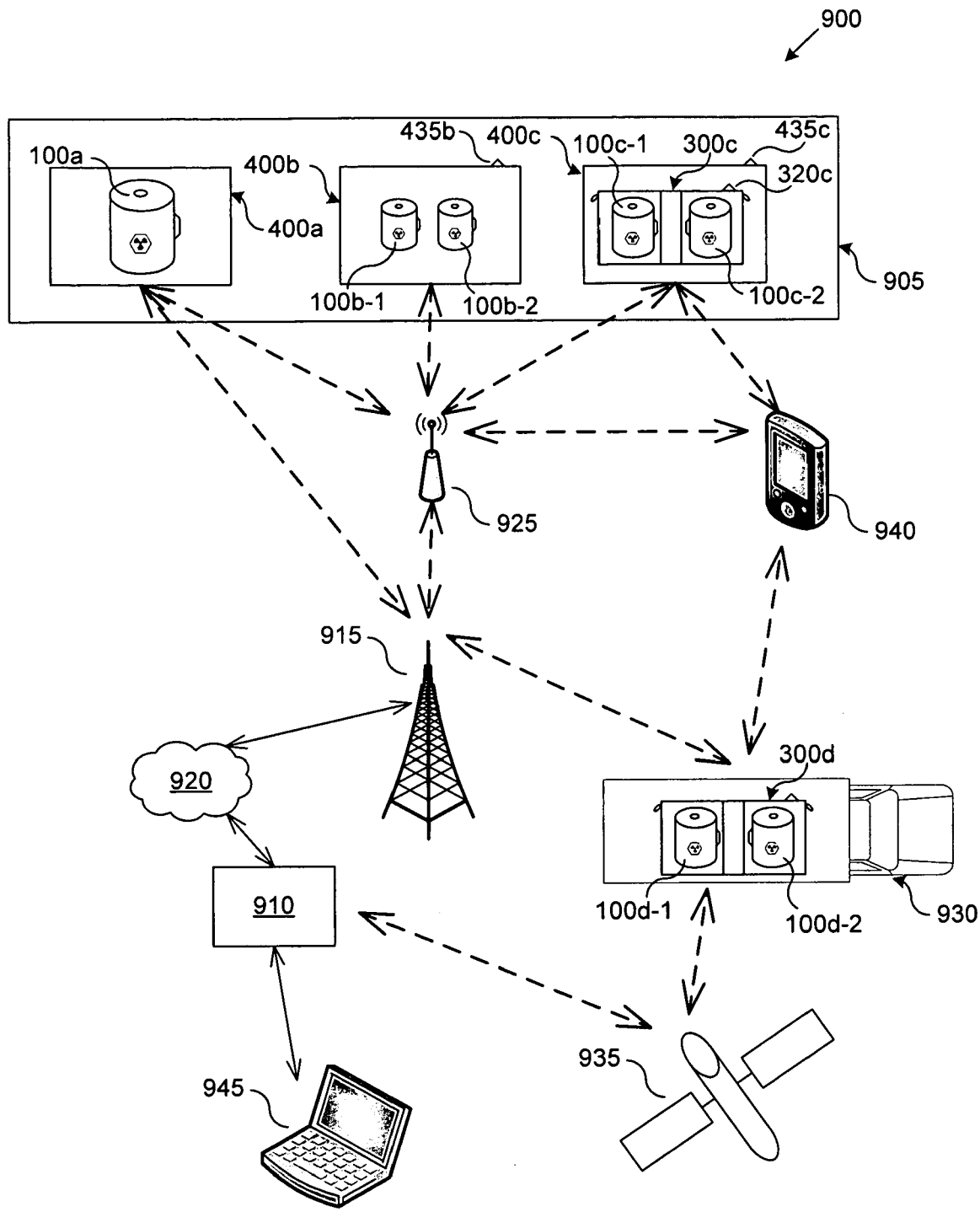
FIG. 9 illustrations a radiation source tracking and reporting system according to embodiments of the present disclosure.

FIG. 9 illustrations a radiation source tracking and reporting system according to embodiments of the present disclosure. The embodiment of the radiation source tracking and reporting system 900 shown in FIG. 9 is for illustration only. Other embodiments of the radiation source tracking and reporting system 900 could be used without departing from the scope of this disclosure.

A storage facility 905 includes a plurality of storage pits 400a, 400b and 400c. It would be understood that illustration of three storage pits is merely exemplary. The storage facility 905 can include any number of storage pits without departing from the scope of this disclosure. A first storage pit 400a includes a first shielded container 100a. The first shielded container 100a includes a first radioactive source 110a. A second storage pit 400b includes two shielded containers, 110b-1 and 110b-2 each including a radioactive source 110b-1 and 110b-2 respectively. A third storage pit 400c includes two shielded containers 100c-1 and 100c-2 housed in an overpack 300c. Each of the shielded containers 100c-1 and 100c-2 includes a radioactive source 110c-1 and 110c-2 respectively. Each of the storage pits 400a-c includes a passive transponder 430. The first storage pit 400a includes a storage pit lid 425 that does not substantially inhibit wireless communications to and from the shielded container 100a. Each of the second and third storage pits 400b-c includes a storage pit lid 425 that substantially inhibits wireless communications to and from the shield containers 100b-c respectively. Each of the second and third storage pits 400b-c also includes an RTD 435.

The first shielded container 100a receives the storage pit ID from the passive transponder 430 of the first storage pit 400a. The first shielded container 100a (e.g., the RSC 130 of the first shielded container 100a) transmits a first message to a central facility 910. The first message includes the storage pit ID, the shielded container ID and an indication that the shielded container 100a includes radioactive source 110a. For example, the first message may state "This is shielded container 'A1' located in storage pit 'SP1A'. Shielded container 'A1' contains a radiation source." Additionally, if programmed into the RSC 110, the first message can include an identifier uniquely associated to radioactive source 110a. In some embodiments, the first message includes a reading from the radiation sensor in the RSC 130. For example, the first message could include a number of counts received by the radiation sensor.

The second shielded containers 100b-1 and b-2 transmit messages to the RTD 435b. Each of the messages includes the shielded container ID and an indication that the shielded container 100a includes radioactive source 110a. The RTD 435 receives the messages and transmits a single message to the central facility 910. The single message includes the storage pit ID, each of the shielded container IDs and an indication whether or not each of the shielded containers 100b-1 and 100b-2 includes a radioactive source 110b-1 and 110b-2. For example, the single message may state "This is storage pit 'SP1B' located with shielded containers 'B1' and 'B2' stored. Shielded container 'B1' contains a radiation source. Shielded container 'B2' contains a radiation source." Additionally, if programmed into the RSCs 110, the single message can include an identifier uniquely associated to radioactive source 110b-1 and 110b-2. In some embodiments, the message includes a reading from the radiation sensor in each of the RSCs 130. For example, the single message could include a number of counts received by the radiation sensor.

The third shielded containers 100c-1 and c-2 transmit messages to the overpack 300c RTD 320c. Each of the messages includes the shielded container ID and an indication that the shielded container 100a includes radioactive source 110a. The RTD 320 receives the messages and transmits an overpack message to the storage pit 400c RTD 435. The RTD 435 receives the overpack message and transmits a second single message to the central facility 910. The single message includes the storage pit ID, the overpack ID, each of the shielded container IDs and an indication whether or not each of the shielded containers 100b-1 and 100b-2 includes a radioactive source 110c-1 and 110c-2. For example, the single message may state "This is storage pit 'SP1B' located with shielded containers 'C1' and 'C2' stored in overpack 'O1'. Shielded container 'C1' contains a radiation source. Shielded container 'C2' contains a radiation source." Additionally, if programmed into the RSCs 110, the second single message can include an identifier uniquely associated to radioactive source 110c-1 and 110c-2. In some embodiments, the message includes a reading from the radiation sensor in each of the RSCs 130. For example, the single message could include a number of counts received by the radiation sensor.

In some embodiments, the first message and the single message are transmitted via a wireless cellular communication via a base station 915 to the central facility 910. The base station 915 is configured to transmit the first message and the single message via a backhaul connection 920 to the central facility 910.

In one embodiment, the first message and the first and second single messages are transmitted to a relay station 925. The relay station 925 may be a regional office with a transceiver or the relay station may be a standalone transceiver with appropriate logic necessary to transmit the messages.

In some embodiments, a truck 930 is transporting one or more shielded containers 100d-1 and 100d-2. The shielded containers 100d-1 and 100d-2 are housed in the overpack 300d. In one such embodiment, the shielded containers 100d-1 and 100d-2 transmit the first messages to the central facility 910 via a satellite 935. In another such embodiment, the overpack 300d transmits the overpack message to the central facility 910 via a satellite 935. In yet another such embodiment, a transceiver on the truck 930 transmits either the first messages or the overpack message to the central facility via satellite 935. Additionally, the first and overpack messages can be transmitted via base station 915.

An external device 940 is configured to communicate with the RSC 110, the RTD 320 and the RTD 435. The external device 940 can be any type of portable device adapted to transmit and receive data communications such as, but not limited to, a cell phone, a personal digital assistance or a laptop computer. The external device 940 is adapted to query the RSC 110, the RTD 320 and the RTD 435 to obtain information about the shielded container 100. The external device 940 is further adapted to program the RSC 110, the RTD 320 and the RTD 435. For example, the external device 940 is configured to allow a user to establish the periodic interval for reporting, to upload or download maintenance history and comments, and to upload or download emergency handling procedures.

The central facility 910 is configured to receive the messages (e.g., the first messages, the overpack messages and the storage pit messages) from a plurality of locations. The central facility 910 is adapted to track the locations of each shielded container 100, overpack 300 and storage pit 400 in a database. The central facility 910 is adapted to report the locations, movement, and histories of each shielded container 100, overpack 300 and storage pit 400 via a user interface 945 such as a computer terminal or website.

In one embodiment, the central facility 910 generates an information data record regarding the locations, movement, and histories of each shielded container 100, overpack 300 and storage pit 400. The central facility 910 creates a website located on a global communication network (GCN) (e.g., the web). The website includes the information data record. Accordingly, a plurality of users are provided access to the locations, movement, and histories of each shielded container 100, overpack 300 and storage pit 400. In some embodiments, the website includes a graphical representation of the locations of the shielded containers 100. In one such embodiment, the website is configured to allow the plurality of users to interact with the graphical representation. For example, a user may be able to select an icon representing a particular shielded container 100. In response, the website displays information corresponding to the selected shielded container 100.

In yet another embodiment, the central facility 910 is configured to send email notifications to the plurality of users. The central facility 910 is configured to send the notifications in response to an "alert" event occurring, at periodic intervals, or both. For example, if a shielded container 100 that does not contain the radioactive source 110 (as reported by the RSC 130), is moved (e.g., transported), the central facility 910 would send an email alert to a predetermined list of users informing them that the shielded container 100 is being moved without the radioactive source 110.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A device for reporting information regarding a shielded container and first radioactive source contained within the shielded container, the device comprising:
   a global positioning system (GPS) device, the GPS device comprising an antenna and a receiver;
   a wireless communication device;
   a first sensor configured to detect the presence of the first radioactive source within the shielded container;
   an external shield configured to inhibit a detection of a second radioactive source located in a position other than within the shielded container; and
   a first processor coupled to each of the GPS device, the wireless communication device and the radiation sensor.

2. The device as set forth in claim 1, further comprising a second sensor configured to detect a motion of the shielded container.

3. The device as set forth in claim 1, wherein the wireless communication device is configured to receive beacon signal comprising a location identifier from an external source and, upon receiving the beacon signal, the processor is configured to transmit at least one of: a location; a second identifier and an indication of the presence of the first radioactive source as part of a message.

4. The device as set forth in claim 1, wherein the processor is configured to detect a change in one of the presence of the radioactive source and the location of the shielded container.

5. The device as set forth in claim 4, wherein the processor is configured to store, in a memory unit, information relating to the detected change and transmit the information to a central facility at a time subsequent to the detection of the change in one of the presence of the radioactive source and location of the shielded container.

6. The device as set forth in claim 1, wherein the communication device comprises at least one of a cellular modem, a satellite modem, a wifi transceiver, and infrared transceiver and a radio frequency transceiver.

7. The device as set forth in claim 1, wherein the first sensor is configured to detect at least one of a Gamma, Beta and Neutron particle.

8. The device as set forth in claim 1, wherein the first sensor is configured to identify the radioactive source.

9. The device as set forth in claim 8, wherein the first sensor comprises at least one of an RFID transponder, a SAW device, and a RuBee™ transceiver.

10. A location-information system for tracking and reporting information regarding a first radioactive source, the system comprising:
    an insulating material disposed around an inner cavity;
    the inner cavity dimensioned to contain the first radioactive source;
    a microcontroller circuit configured to detect the presence or absence of the radioactive source within the inner cavity;
    an external shield configured to inhibit the detection of a second radioactive source located in a position other than within the inner cavity;
    a wireless communication device configured to receive command and query information and transmit report information, the wireless communication device further configured to receive a beacon signal comprising an external identifier from an external terrestrial source; and
    a location determination device.

11. The location-information system as set forth in claim 10, wherein said information comprises at least one of geographic location information, storage pit identification information, radiation level information, radiation type information, maintenance history, handling procedures and emergency response documentation.

12. The location-information system as set forth in claim 10, wherein the beacon signal comprises a storage pit identifier from a beacon device located within a storage pit.

13. The location-information system as set forth in claim 12, wherein the beacon device is an RFID.

14. The location-information system as set forth in claim 12, wherein the wireless communication device is configured to transmit the report information to a relay device, the report information comprising at least one of a radioactive source identifier, a shielded container identifier and the storage pit identifier.

15. The location-information system as set forth in claim 14, wherein the relay device is configured to receive the report information from the wireless communication device and transmit the report information to a central facility.

16. The location-information system as set forth in claim 10, further comprising an accelerometer configured to detect a motion.

17. The location-information system as set forth in claim 10, wherein the plurality of sensors are configured to detect at least one of Gamma, Beta or Neutron particles.

18. The location information system as set forth in claim 10, wherein the microcontroller circuit is configured to identify the radioactive source.

19. A method for monitoring a first radioactive source in a shielded container, the method comprising:
    detecting the presence of the first radioactive source contained within the shielded container;
    inhibiting a detection of a second radioactive source located in a position other than within the shielded container;
    determining a location of the shielded container;
    receiving a beacon signal comprising an external identifier from an external terrestrial source; and
    upon receiving the beacon signal, transmitting a message, the message including at least one of the location of the shielded container, an identifier corresponding to the shielded container, and an indication of at least one of the presence or absence of the radioactive source.

20. The method as set forth in claim 19, further comprising the steps of detecting a change in one of the presence of the radioactive source and location of the shielded container.

21. The method as set forth in claim 20, further comprising the steps of storing information relating to the detected change in a memory unit and transmitting the information to a central facility at a time subsequent to the detection of the change in one of the presence of the radioactive source and location of the shielded container.

22. The method as set forth in claim 19, wherein the external source is a relay transceiver associated with an overpack or a storage pit.

23. The method as set forth in claim 19, wherein the step of detecting the presence of the radioactive source further comprises identifying the radioactive source.

* * * * *